United States Patent [19]

Nyer

[11] 4,162,216
[45] Jul. 24, 1979

[54] PROCESS FOR REMOVAL OF SUSPENDED SOLIDS FROM LIQUID

[75] Inventor: Evan K. Nyer, Monroe, N.Y.

[73] Assignee: Union Carbide Corporation, New York, N.Y.

[21] Appl. No.: 845,300

[22] Filed: Oct. 25, 1977

[51] Int. Cl.² ............................................. B01D 23/24
[52] U.S. Cl. .................................... 210/73 R; 210/80; 210/81
[58] Field of Search ..................... 210/27, 30 R, 73 R, 210/73 S, 79, 80, 81, 82, 276, 298, 317, 319, 332, 335, 353, 354, 355, 407, 408, 413, 414, 415

[56] References Cited

U.S. PATENT DOCUMENTS

| 402,224 | 4/1889 | Blessing | 210/335 |
|---------|--------|----------|---------|
| 751,061 | 2/1904 | Deshler | 210/276 |
| 862,156 | 8/1907 | Hartsough | 210/276 |
| 3,352,778 | 11/1967 | Brink et al. | 210/23 |
| 3,617,551 | 11/1971 | Johnston | 210/23 |
| 3,779,908 | 12/1973 | Gregory | 210/23 |

FOREIGN PATENT DOCUMENTS 49-64261 6/1974 Japan.
457667 1/1975 U.S.S.R.

Primary Examiner—Charles N. Hart
Assistant Examiner—Ivars Cintins
Attorney, Agent, or Firm—Steven J. Hultquist

[57] ABSTRACT

A process for removal of solids from a liquid containing suspended solids by flowing the liquid through a filter bed of discontinuous polyurethane particles in a filtration vessel. For renewal of the filter bed, deposited solids are removed from the discontinuous polyurethane particles by adding at least one bed volume of a regeneration liquid to the filter vessel and mechanically mixing the filter bed of polyurethane particles in a total volume of liquid comprising the regeneration liquid and the hold-up liquid in the filter bed resulting from the termination of liquid flow therethrough, thereby forming solids-enriched liquid, and discharging the solids-enriched liquid from the filtration vessel.

17 Claims, 3 Drawing Figures

PROCESS FOR REMOVAL OF SUSPENDED SOLIDS FROM LIQUID

BACKGROUND OF THE INVENTION

1. Field of the Invention

This invention relates to a process for removal of solids from a liquid containing suspended solids by flowing the liquid through a filter bed of discontinuous polyurethane particles.

2. Description of the Prior Art

In the field of liquid and wastewater treatment, filtration has long been a major method of removing suspended solids from liquid streams. In wastewater treatment applications in particular, the presence of suspended solid materials is frequently a major process problem and filtration has commonly been employed as a means of reducing and/or removing suspended solids from streams such as municipal sewage and wastewater intended for recycle use. In such applications, downflow and upflow sand filters and dual or mixed media filters have been widely employed and have in general been shown to be cost effective and efficient in use. Nonetheless, work by practitioners in the field has shown that sand and mixed media filters are in general effective in removing suspended solids, but only under limited solids loading conditions. In general, solids concentration of the liquid stream entering the filter must be below about 100-200 milligrams/liter. At suspended solids concentration values above this level, the filtration bed is susceptible to clogging and high pressure drop across the bed.

In recent years, the operation of filtration has been somewhat improved in the foregoing applications by the use of polyurethane as a filtration medium. In general practice, polyurethane foam is cut up into small pieces and placed into a retaining vessel to form the filtration bed. Wastewater or other liquid containing suspended solids is then flowed through the bed with resulting deposition of suspended solids on the polyurethane particles. The suspended solids thus remain on the polyurethane particles and the liquid from which the suspended solids has been deposited subsequently passes through the bed and is discharged as liquid depleted in suspended solid contaminants.

In general, the use of polyurethane foam as a filtration medium provides numerous operating advantages over beds employing sand or conventional mixed media filtration materials, including higher solids capacity, lower pressure drop head losses, higher resistance to clogging and removal of numerous soluble organic contaminants from the liquid stream.

Despite its numerous operating advantages, however, regeneration of the polyurethane foam which has become loaded with suspended solids in the filtration operation has continued to pose a severe operating problem. Various methods have been contemplated for regeneration of the polyurethane foam filtration bed which has become at least partially loaded with suspended solids during the filtration step, including backwashing with a solids-depleted liquid stream, such as is commonly employed in conventional sand and mixed media filtration systems. The use of back washing in a polyurethane foam filtration bed poses a specific problem due to the low density of the polyurethane foam filtration medium. Since polyurethane has a true density which may be as low as 1-2 pound/foot$^3$, it is generally desirable in normal operation to flow liquid containing suspended solids downwardly through the bed of polyurethane foam material. Back washing of such a filtration bed, which involves counter-currently flowing a stream of clean liquid upwardly through the filtration bed, in general requires such high flow velocities through the bed as to wash particles of polyurethane foam out of the bed or else causes such disruption of the bed as to leave large void spaces therein which contribute to bypassing and other disadvantageous performance behavior in the subsequent filtration step. If, on the other hand, the bed of polyurethane foam is regenerated in the same manner as the normal filtration step, by flowing a stream of solids-depleted liquid downwardly through the solids-loaded bed, it is generally difficult to obtain sufficient removal of suspended solids from the polyurethane particles to satisfactorily renew the bed for the subsequent filtration step.

Faced with the foregoing difficulties in the application of conventional back washing to the polyurethane foam filtration bed, and in view of the extremely low density of the polyurethane foam filtration medium relative to conventional media, the prior art has proposed various means for compression regeneration of the polyurethane foam in the filtration bed. Such compression regeneration generally involves the use of mechanical means for "squeezing" the particles of polyurethane foam, thereby "wringing out" the contained water along with the deposited solids from the particles of polyurethane foam. Although such method of regeneration is easily employed on a laboratory or bench-scale filtration unit, the mechanical complexity and attendant capital expense of means for squeezing the foam particles in commercial scale polyurethane foam filtration beds has severely limited the utility of polyurethane foam filtration beds in practice.

Accordingly, it is an object of the present invention to provide an improved process for removing deposited suspended solids from polyurethane particles in a filtration bed of such particles.

It is another object of the invention to provide such a process which requires only a very low volume of regeneration liquid.

Other objects and advantages of the present invention will be apparent from the ensuing disclosure and appended claims.

SUMMARY OF THE INVENTION

This invention relates to a process for removal of solids from a liquid containing suspended solids.

In the process of this invention, a filtration vessel containing a filter bed of discontinuous polyurethane particles is provided. The liquid containing suspended solids is flowed through the filter bed in the filtration vessel for deposition of the solids on the polyurethane particles to form solids-depleted liquid and solids-depleted liquid is discharged from the filtration vessel, until the filter bed is at least partially loaded with removed solids. The flow of liquid through the filter bed is terminated. Deposited solids are removed from the discontinuous polyurethane particles in the filter bed, thereby renewing the filter bed for solids removal from the liquid containing suspended solids.

In the improvement of the invention, the removal of deposited solids from the discontinuous polyurethane particles in the filter bed is carried out by adding at least one bed volume of regeneration liquid to the filtration vessel and mechanically mixing the filter bed of discontinuous polyurethane particles having the solids deposited thereon in a total volume of liquid comprising the regeneration liquid and the hold-up liquid in the filter bed resulting from the termination of liquid flow through the filter bed to cause deposited solids to disengage from the discontinuous polyurethane particles and pass into the total volume of liquid, thereby forming solids-enriched liquid. The solids-enriched liquid is discharged from the filtration vessel.

In one preferred embodiment of the present invention the filter bed occupies no more than one-half the volume of the filtration vessel, and the mechanical mixing comprises mechanically agitating the filter bed of polyurethane particles.

In another preferred embodiment of the present invention, the regeneration liquid comprises between one and two bed volumes of liquid.

As used herein, "regeneration liquid" means liquid which is able to take up in suspended form the deposited solids which are disengaged from the filter bed of polyurethane particles during the mechanical mixing thereof. In preferred practice, the regeneration liquid is substantially free of suspended solids. As used herein, "hold-up liquid in the filter bed" refers to the interstitial liquid between particles of polyurethane and to the liquid which is retained in the pores of the polyurethane particles in the filter bed subsequent to termination of liquid flow through the filter bed. "Bed volume" means a unit volume of liquid which is equal to the volume of the filter bed.

BRIEF DESCRIPTION OF THE PREFERRED EMBODIMENTS

Figure 1:
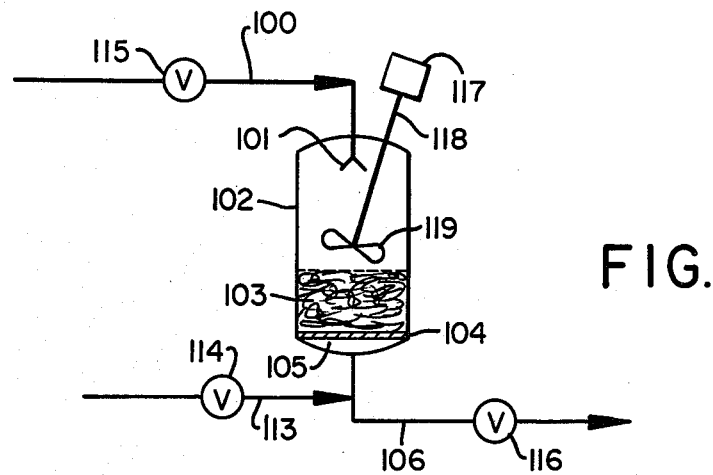
FIG. 1 is a schematic diagram of a filter bed of discontinuous polyurethane particles, such as may suitably be used in the practice of the present invention.

Referring now to FIG. 1, liquid containing suspended solids enters the treatment system in line 100 having control valve 115 disposed therein, which is open during the initial phase of operation. This liquid may be from a variety of sources, as for example a biological treatment plant effluent having 40-60 parts per million suspended solids or river water for a municipal water treatment facility. Alternatively, the liquid could comprise raw water intended for boilers or for internal industrial plant use or it could be a stream from an algae pond (oxidation ditch) which is treated to prevent pinpoint algae flocs from reaching the receiving waters. From line 100, the liquid enters the filtration vessel 102 and is discharged in the upper end thereof through a spray distributor or other discharge device 101. The filtration vessel 102 may suitably be constructed from carbon steel or other structural material and is only partially filled with a filter bed of discontinuous polyurethane particles 103, for reasons which will be more fully apparent hereinafter. The filtration vessel has an upper inlet end and a lower discharge end. The filter bed of discontinuous polyurethane particles is supported within the vessel by a lower supporting structure 104, which may suitably comprise a retaining grid of screen or other fine mesh material. In this manner a plenum space 105 is formed at the lower end of the vessel 102, for collection of the liquid which has been passed through the filter bed.

The liquid containing suspended solids is flowed through the filter bed in the filtration vessel from the upper inlet end to the lower discharge end for deposition of the solids from the liquid on the polyurethane particles, to effect removal of the solids by the filter bed. Solids-depleted liquid is thereby formed which collects in the lower plenum space 105 and is discharged from the filtration vessel in line 106, having open control valve 116 disposed therein. From line 106, the solids-depleted liquid is passed to receiving waters and/or other treatment and end use.

The previously described flow of liquid containing suspended solids is continued until the filter bed is at least partially loaded with deposited solids, whereupon the flow of liquid through the filter bed is terminated, and the filter bed is ready for renewal.

In order to enhance the solids collection removal efficiency of the filter bed in the previously described system, it may be desirable in some instances to add a coaugulant material, such as an organic polymer coagulant, sodium silicate or alum, to the liquid being introduced to the filter. Such coaugulants are in some applications desirable in order to increase the flocculation of suspended solids in the liquid undergoing treatment and to reduce the turbidity of the final effluent discharged from the filter bed treatment system.

The polyurethane particles employed in the filter bed of the present invention may be of any suitable foam type having the requisite solids loading capacity for the filtration step operating time employed. The discontinuous polyurethane employed in the particles of the filter bed may suitably be in the form of shredded nonuniformly sized particles or, alternatively, the polyurethane particles in the filter bed may have a cubic form, as may be obtained by physically cutting a body of polyurethane foam into small sized particles such as cubes having sides of $\frac{1}{4}$ to 1 inch length. Suitable polyurethane foam materials which have been employed successfully in practice have a cellular density of from 10 to 100 cells/inch. The true density of the polyurethane particles in the filter bed should preferably be greater than about 1.34 lbs./ft.$^3$ in order to provide structural integrity of the bed and to preclude floating of the polyurethane particles during the filtration step. The polyurethane particles in the filter bed preferably have a solids loading capacity of at least one-half pound suspended solids/ft$^3$ polyurethane particles, in order to provide suitably high capacity for solids loading during the filtration step. By way of example, a suitable foam polyurethane material for use in the process of the present invention may be shredded in form, with particle lengths on the order of 1-2 inches, 30 cells/linear inch, a particle thickness on the order of 0.25 inch, a true density (measured without voids) of 1.77 lbs./ft.$^3$ and a tensile strength of 23.5 psi.

During the filtration step, the volumetric flow velocity of the liquid containing suspended solids through the filter bed is desirably maintained between 1 and 10 gal/minute/ft$^2$ of filter bed cross-sectional area, in order to provide adequate contacting of the liquid with the polyurethane particles in the filter bed without the occurrence of bypassing or other anomalous flow phenomena. After the filter bed is at least partially loaded with deposited solids, the flow of liquid through the filter bed is terminated. Subsequently, deposited solids are removed from the discontinuous polyurethane particles in the filter bed, thereby renewing the filter bed for solids removal from the liquid containing suspended solids.

Figure 2:
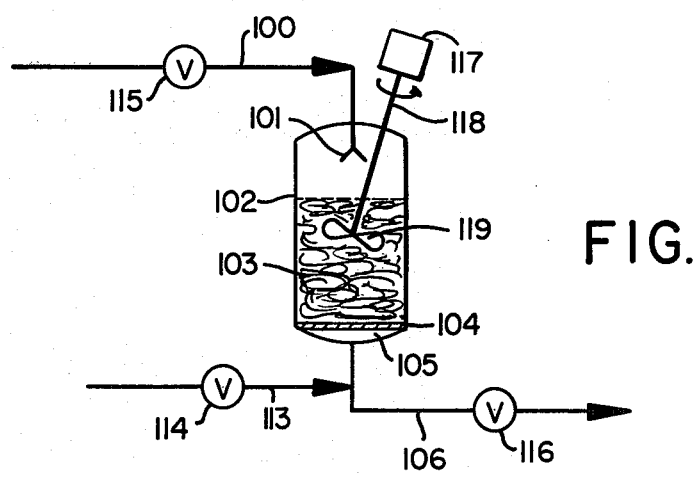
FIG. 2 is a schematic view of the FIG. 1 filter bed during the regeneration step.

Prior to the renewal step, the flow of liquid through the filter bed 103 is terminated, as for example by closing the control valves 115 and 116 in lines 100 and 106 respectively. At the termination of flow of liquid through the filter bed, hold-up liquid will remain in the filter 103. In the renewal step, at least one bed volume of a regeneration liquid is added to the filtration vessel 102, to form a total volume of liquid in the filtration vessel comprising the regeneration liquid and the hold-up liquid in the filter bed resulting from the termination of liquid flow through the filter bed. FIG. 2 shows the system of FIG. 1 wherein the filtration vessel contains the aforementioned total volume of liquid. Prior to the addition of regeneration liquid to the filtration vessel, the filtration vessel will generally contain sufficient hold-up liquid to constitute a major fraction of a bed volume of liquid due to the high porosity of the filter bed of polyurethane particles. For example, the porosity of the filter bed of polyurethane particles may be on the order of 80%, whereby the filtration vessel at the termination of liquid flow through the filter bed would contain 0.80 bed volume of hold-up liquid as interstitial liquid between the particles of polyurethane and liquid retained in the pores of the polyurethane particles in the filter bed.

As stated earlier herein, the term "bed volume" means a unit volume of liquid which is equal to the volume of the filter bed. Thus, if a filter bed is provided which is two feet in height in the filtration vessel, the addition of one bed volume of additional liquid (regeneration liquid) would result in the provision of an admixture of polyurethane particles and liquid phase wherein the height of the liquid in the filtration vessel would be 4 ft.

The regeneration liquid added to the filtration vessel in the renewal step may comprise liquid containing suspended solids which is introduced to the filtration vessel in line 100, following which valve 115 in line 100 is closed. Alternatively, the regeneration liquid may comprise solids-depleted liquid, as for example clean water, when the liquid containing suspended solids is water. The solids-depleted liquid may be introduced countercurrently into the filtration vessel following termination of liquid flow through the filter bed by flow of the regeneration liquid through line 113 and countercurrently through that portion of line 106 which is directly beneath filtration vessel 102. In the latter case, valve 114 in line 113 is open, while valves 115 in line 100 and valve 116 in line 106 are closed. During the normal filtration step, valve 114 is closed, while valves 115 and 116 are open. The switching of the various respective valves may be carried out by a cycle time control system of a type well known to those skilled in the art.

After at least one bed volume of regeneration liquid has been added to the filtration vessel, as shown in FIG. 2, all valves 114, 115 and 116 are closed. In preferred practice, the filter bed, as shown in FIG. 1, occupies no more than one-half the volume of the filtration vessel, so as to allow for introduction of at least one bed volume of regeneration liquid to the filtration vessel. In the regeneration step, as mentioned, the filtration vessel contains a total volume of liquid comprising the regeneration liquid and the hold-up liquid in the filter bed resulting from the termination of liquid flow through the filter bed. In the general practice of the present invention, the hold-up liquid in the filter subsequent to the termination of liquid flow through the filter bed is intended to be construed broadly so as to include hold-up liquid in the filter bed, constituted by solids-depleted liquid remaining in the bed following the termination of liquid flow therethrough as well as to include the interstitial liquid between particles of polyurethane and the liquid which is retained in the pores of the polyurethane particles in the filter bed when the filter vessel is drained of liquid following the termination of liquid flow through the filter bed and the hold-up liquid is replaced by a fractional bed volume of regeneration liquid. In other words, it is contemplated in the broad practice of the present invention to completely drain the filtration vessel of liquid following the filtration step and then to fill the filtration vessel with regeneration liquid to the desired extent such that a portion of the total volume of liquid replaces the hold-up liquid which was previously contained between the particles of polyurethane and in the pores of the polyurethane particles in the filter bed. In this manner, the fractional bed volume of regeneration liquid which fills the pores and interstices of the filter bed becomes the hold-up liquid in the filter bed. Nonetheless, it is generally preferred in practice to retain the hold-up liquid in the filter bed resulting from the termination of liquid flow through the filter bed in order to minimize the filter bed regeneration time and to simplify the regeneration procedure.

In the system as shown in FIG. 2, after the regeneration liquid had been introduced to the filtration vessel to form a total volume of liquid comprising the regeneration liquid and the hold-up liquid therein, the filter bed of discontinuous polyurethane particles having the solids deposited thereon is mechanically mixed to cause deposited solids to disengage from the discontinuous polyurethane particles and pass into the total liquid volume, thereby forming solids-enriched liquid. This is carried out by energizing the motor drive means 117 which is connected by rotating shaft member 118 to rotating impeller means 119. In this manner, the filter bed is mechanically mixed by agitating the polyurethane particles in the total liquid volume in the filtration vessel. Such agitation causes disengagement of the deposited solids from the polyurethane particles in the bed and forms the aforementioned solids-enriched liquid in the filtration vessel. After a suitable period of agitation, which for example may be 1–3 minutes, when disengagement of deposited solids from the polyurethane particles has been effected, the motor drive means 117 is deenergized and the solids-enriched liquid is discharged from the filtration vessel in line 106 by opening of valve 116. The solids-enriched liquid in line 106 may be passed to further treatment and/or end use facilities, such as sludge drying beds. After the solids-enriched liquid is fully discharged from the filtration vessel, the filter bed is fully renewed for the subsequent filtration step, which may be initiated by opening valve 115 in feed liquid line 100 to admit liquid containing suspended solids to the filtration vessel 102 for filtration therein as earlier described.

It was stated earlier herein that the regeneration liquid preferably comprises between one and two bed volumes of liquid. Such volumetric amounts of regeneration liquid are satisfactory in the broad practice of the present invention to fully regenerate the polyurethane particle filter bed. By way of example, experience has shown that a 30 cell per linear inch polyurethane foam filter bed can be satisfactory regenerated in one bed volume of regeneration liquid (in addition to the hold-up liquid in the filtration vessel.) A 60 cell per linear inch polyurethane foam filter bed, on the other hand, has been found to require 1.6 bed volumes of regeneration liquid (in addition to the hold-up liquid in the filtration vessel) for efficient regeneration. This difference is due to the fact that the 60 cell polyurethane foam is less dense than the 30 cell polyurethane foam and thus the former requires a correspondingly greater volume for mechanical mixing in the regeneration step.

Figure 3:
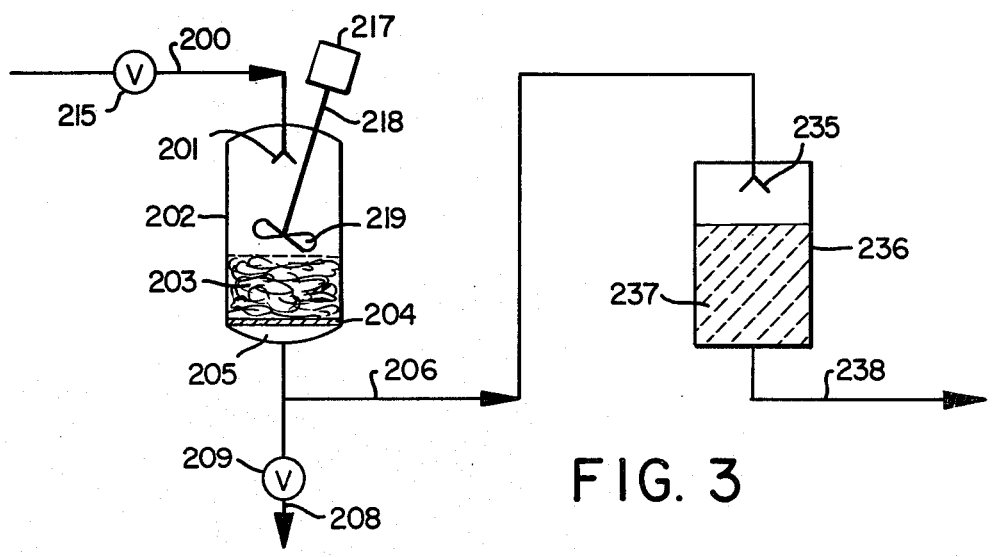
FIG. 3 is a schematic diagram of another embodiment of the present invention, wherein a filter bed of discontinuous polyurethane particles is disposed upstream of a conventional sand filter.

Referring now to FIG. 3, there is shown a schematic diagram of another process system in which the process of the instant invention can be carried out. Liquid containing suspended solids is introduced into the system in line 200 having control valve 215 disposed therein from which it is distributed by the distributor means 201 at the upper end of the filtration vessel 202 to the filter bed 203 of discontinuous polyurethane particles contained in the filtration vessel. The filter bed of discontinuous polyurethane particles has an upper inlet end and a lower discharge end, with the latter resting on support structure 204, which provides a lower plenum space 205 for collection of purified liquid from the filter bed. The liquid containing suspended solids is flowed through the filter bed in the filtration vessel for deposition of the solids on the polyurethane particles to form solids-depleted liquid. The solids-depleted liquid is discharged from the filtration vessel 202 in line 206. During the normal filtration step valve 215 in line 200 is open and valve 209 in line 208 is closed.

From line 206, solids-depleted liquid is passed to the downstream filter bed 237 for final effluent polishing of the liquid. The downstream filter bed 237 may be a conventional sand filter or of a mixed media type. The downstream bed 237 is contained in vessel 236 and receives liquid from line 206 through distributor means 235, which may be of a type similar to that employed in filtration vessel 202. The liquid flowing through the downstream filter bed 237 is discharged therefrom in line 238 and passed to receiving waters and/or other desired end use.

The above-described filtration step is continued until the filter bed is at least partially loaded with deposited solids, at which point the flow of liquid through the filter bed is terminated. The filter bed of polyurethane particles is now ready for renewal by removal of deposited solids from the discontinuous polyurethane particles of the bed, thereby re-establishing the capability of the filter bed for solids removal from the liquid containing suspended solids.

In the renewal step, at least one bed volume of regeneration liquid is added to the filtration vessel 202. The filter bed of discontinuous polyurethane particles having the solids deposited thereon is then mechanically mixed by agitation by energizing motor drive means 217 which is connected by shaft member 218 to impeller means 219. Mixing agitation is carried out for a suitable time, as for example 1–3 minutes, in a total volume of liquid comprising the regeneration liquid and the hold-up liquid in the filter bed resulting from termination of liquid through the filter bed, to cause deposited solids to disengage from the discontinuous polyurethane particles and pass into the total liquid volume, thereby forming solids-enriched liquid. At this point valve 209 in line 208 is opened and the solids-enriched liquid is discharged from the filtration vessel in line 208. Subsequent to the discharge of solids-enriched liquid from the filtration vessel 202, the filter bed 203 in the vessel is renewed and ready for the normal filtration step. The second filter bed 237 may be regenerated in any suitable manner such as by conventional back-washing.

The advantages of the present invention are illustrated in the following example.

EXAMPLE

A comparative performance evaluation was carried out on filter beds regenerated by back-washing and by agitation mixing in manner of the present invention. In the evaluation, two filter beds were arranged in parallel flow relationship and were arranged to filter identical respective portions of a common flow of solids-containing waste water. Each bed was contained in a glass column having an inner diameter of 14 centimeters. Each contained 75 grams of a 60 cell per linear inch shredded polyurethane foam of approximately 95% porosity which formed filter beds in the respective columns each 23 centimeters in height, at a packing density of 30 grams of polyurethane foam per liter of filter bed volume.

The respective filter beds each processed a flow of 200 milliliters of suspended solids containing waste water per minute. Four separate runs were made with regeneration between successive filtration steps and the fourth run was considered as representative of steady state operating conditions. Each filtration step was carried out for 8 hours. Subsequent to the termination of the filtration step, one of the filter beds was regenerated by back-washing and the other was regenerated by agitation mixing in the manner of the present invention.

In the back-washing regeneration step for the first filter bed, clean water was flowed as the back-wash medium through the filter bed in a direction countercurrent to the down flow direction of liquid flow through the filter bed during the normal filtration step. In the back-washing step, the back-washing flow rate was 18 gallons per minute per ft.$^2$ of filter bed cross-sectional area. Regeneration was carried out for 5 minutes, at which time the effluent back-wash liquid appeared to be relatively solids-free.

In the filter bed regenerated in accordance with the method of the present invention, one bed volume of regeneration liquid (clean water) was added to the filtration vessel and the filter bed was mechanically mixed in a total volume of liquid comprising the one additional bed volume of regeneration liquid and the hold-up liquid in the filter bed resulting from the termination of liquid flow through the filter bed. Following the addition of the regeneration liquid, the filter bed was mixed for two minutes by an impeller comprising four 45° pitched blades. The diameter of the mixing impeller was approximately 5 centimeters and the impeller was rotated during the mixing agitation step at a rotational speed on the order 100–200 rpm. The mixing agitation was then terminated and the bed was drained of liquid. The filter bed was then refilled with two additional bed volumes of clean water and again mechanically mixed for two minutes. The mixing agitation was again terminated and the bed returned to the filtration operation.

Comparative performance data for the respective regeneration modes are set forth below in Table I.

Table I

Comparative Performance of Filter Beds Regenerated by Back-washing and by Agitation Mixing

| Parameter | Regeneration Method | |
| --- | --- | --- |
| | Backwashing | Agitation Mixing |
| Total Regeneration Liquid Volume, gal. | 14 | 4.5 |
| Solids initially on filter bed, gms. | 18 | 18 |
| Solids on filter bed after regeneration, gms. | 5 | 0.5 |
| Solids removed, % | 72% | 97.5% |

As shown by the data, the backwashing regeneration method required 14 gals. of total regeneration liquid, whereas the agitation mixing regeneration method of this invention required only 4.5 gals. (note: the total regeneration liquid volume listed in the Table for the agitation mixing method comprises the added bed volumes of regeneration liquid and the hold-up liquid in the filter bed contained in the pores and interstices of the filter bed). As also shown by the data, the back-washing regeneration method yielded only a 72% solids removal from the filter bed, despite the large volume of regeneration liquid employed, while the agitation mixing regeneration method of the present invention resulted in a 97.5% solids removal.

Although preferred embodiment of the invention have been described in detail, it is to be recognized that other embodiments only with modification of the disclosed features are contemplated as being within the scope of the invention.

What is claimed is:

1. In a process for removal of solids from a liquid containing suspended solids including the steps of:
   (a) providing a filtration vessel containing a filter bed of discontinuous polyurethane particles;
   (b) flowing said liquid containing suspended solids through said filter bed in said filtration vessel for deposition of said solids on said polyurethane particles to form solids-depleted liquid, and discharging solids-depleted liquid from said filtration vessel, until said filter bed is at least partially loaded with deposited solids;
   (c) terminating the flow of liquid through said filter bed; and
   (d) removing deposited solids from the discontinuous polyurethane particles in said filter bed, thereby renewing said filter bed for solids removal from said liquid containing suspended solids,
   the improvement wherein the removal of deposited solids from the discontinuous polyurethane particles of said filter bed comprises the steps of:
   adding at least one bed volume of a regeneration liquid to said filtration vessel,
   mechanically mixing said filter bed of discontinuous polyurethane particles having said solids deposited thereon in a total volume of liquid in said filtration vessel comprising said regeneration liquid and the hold-up liquid in said filter bed resulting from said termination of liquid flow therethrough, without removal of liquid from said filtration vessel during said mixing therein, to cause deposited solids to disengage from said discontinuous polyurethane particles and pass into said total liquid volume, thereby forming solids-enriched liquid, and discharging said solids-enriched liquid from said filtration vessel.

2. A process according to claim 1 wherein said filter bed occupies no more than one-half the volume of said filtration vessel.

3. A process according to claim 2 wherein said mechanical mixing comprises mechanically agitating said filter bed of polyurethane particles.

4. A process according to claim 1 wherein said regeneration liquid comprises between one and two bed volume of liquid.

5. A process according to claim 1 wherein said regeneration liquid comprises solids-depleted liquid.

6. A process according to claim 1 wherein said regeneration liquid comprises liquid containing suspended solids.

7. A process according to claim 1 wherein said discontinuous polyurethane is in the form of shredded non-uniformly sized particles.

8. A process according to claim 1 wherein said discontinuous polyurethane has a cellular density of from 10 to 100 cells/inch.

9. A process according to claim 1 wherein said liquid containing suspended solids is water.

10. A process according to claim 1 wherein the volumetric flow velocity of said liquid containing suspended solids through said filter bed is between 1 and 10 gal/min/ft$^2$ of filter bed cross-sectional area.

11. A process according to claim 1 wherein the true density of the polyurethane particles in said filter bed is greater than 1.34 lbs/ft$^3$.

12. A process according to claim 1 wherein the polyurethane particles in said filter bed have a solids loading capacity of at least 0.5 lb. suspended solids/ft$^3$ polyurethane particles.

13. A process according to claim 1 wherein the polyurethane particles in said filter bed have a cubic form.

14. A process according to claim 1 wherein the solids-depleted liquid discharged from said filtration vessel is passed through a second filter bed for final effluent polishing of said liquid.

15. In a process for removal of solids from a liquid containing suspended solids including the steps of:
   (a) providing a filtration vessel containing a filter bed of discontinuous polyurethane particles;
   (b) flowing said liquid containing suspended solids through said filter bed in said filtration vessel for deposition of said solids on said polyurethane particles to form solids-depleted liquid, and discharging solids-depleted liquid from said filtration vessel, until said filter bed is at least partially loaded with deposited solids;
   (c) terminating the flow of liquid through said filter bed; and
   (d) removing deposited solids from the discontinuous polyurethane particles in said filter bed, thereby renewing said filter bed for solids removal from said liquid containing suspended solids,
   the improvement wherein the removal of deposited solids from the discontinuous polyurethane particles of said filter bed comprises the steps of:
   adding a regeneration liquid to said filtration vessel,
   mechanically mixing said filter bed of discontinuous polyurethane particles having said solids deposited thereon in a total volume of liquid in said filtration vessel comprising said regeneration liquid and at least equal to the volume of hold-up liquid in said filter bed at the termination of liquid flow through said filter bed and one bed volume of additional liquid, without removal of liquid from said filtration vessel during said mixing therein, to cause deposited solids to disengage from said discontinuous polyurethane particles and pass into said total liquid volume, thereby forming solids-enriched liquid, and discharging said solids-enriched liquid from said filtration vessel.

16. A process according to claim 15 wherein said filter vessel is drained of liquid following the termination of liquid flow through said filter bed and the holdup liquid resulting from the termination of liquid flow through the filter bed is replaced by a fractional bed volume of regeneration liquid.

17. A process according to claim 16 wherein said regeneration liquid comprises between one and two bed volume of liquid in addition to a fractional bed volume of liquid equal to the volume of hold-up liquid in said filter bed resulting from the termination of liquid flow therethrough.

* * * * *